April 22, 1941.  A. ROBER  2,239,016

WATER PROPELLING DEVICE

Filed Jan. 10, 1938  4 Sheets-Sheet 1

INVENTOR
ANTON ROBER.
BY Harry C. Shortz
ATTORNEY.

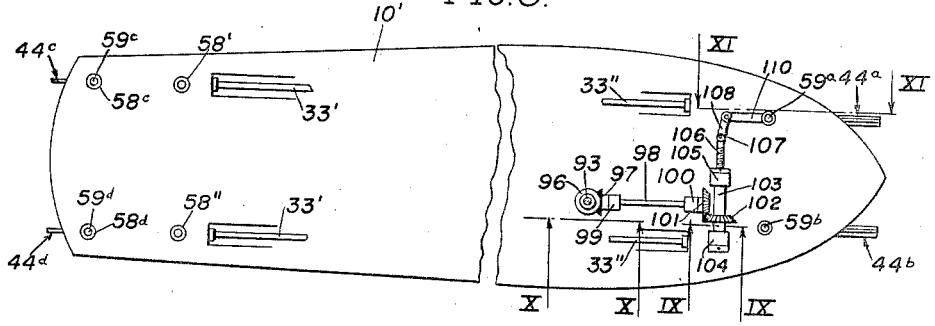
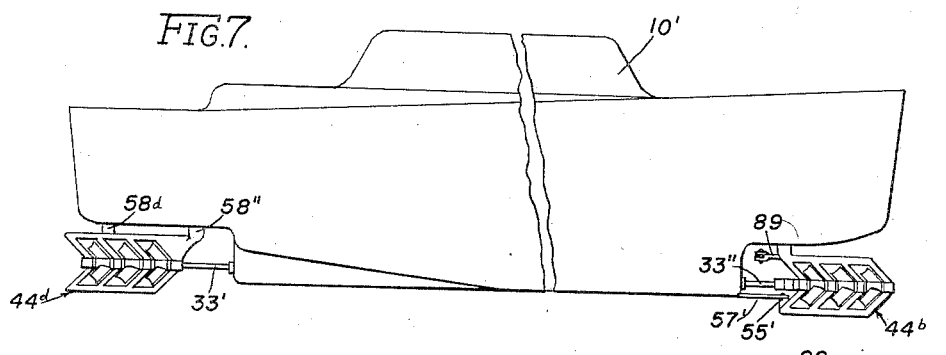
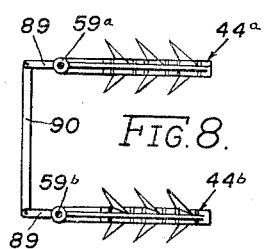
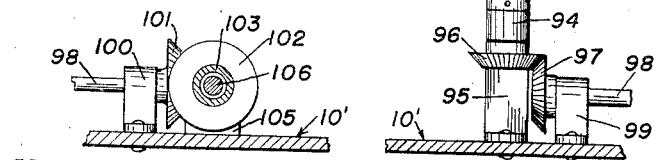
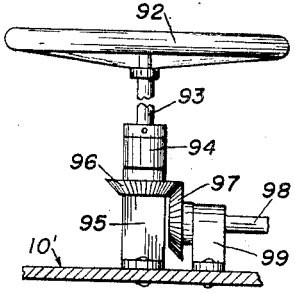
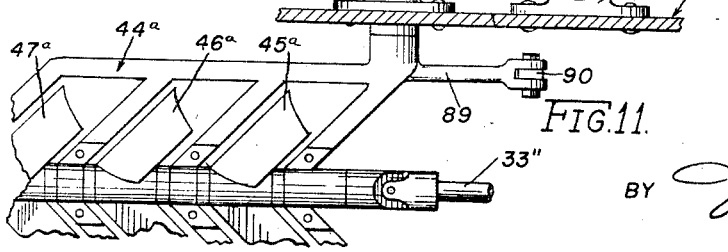

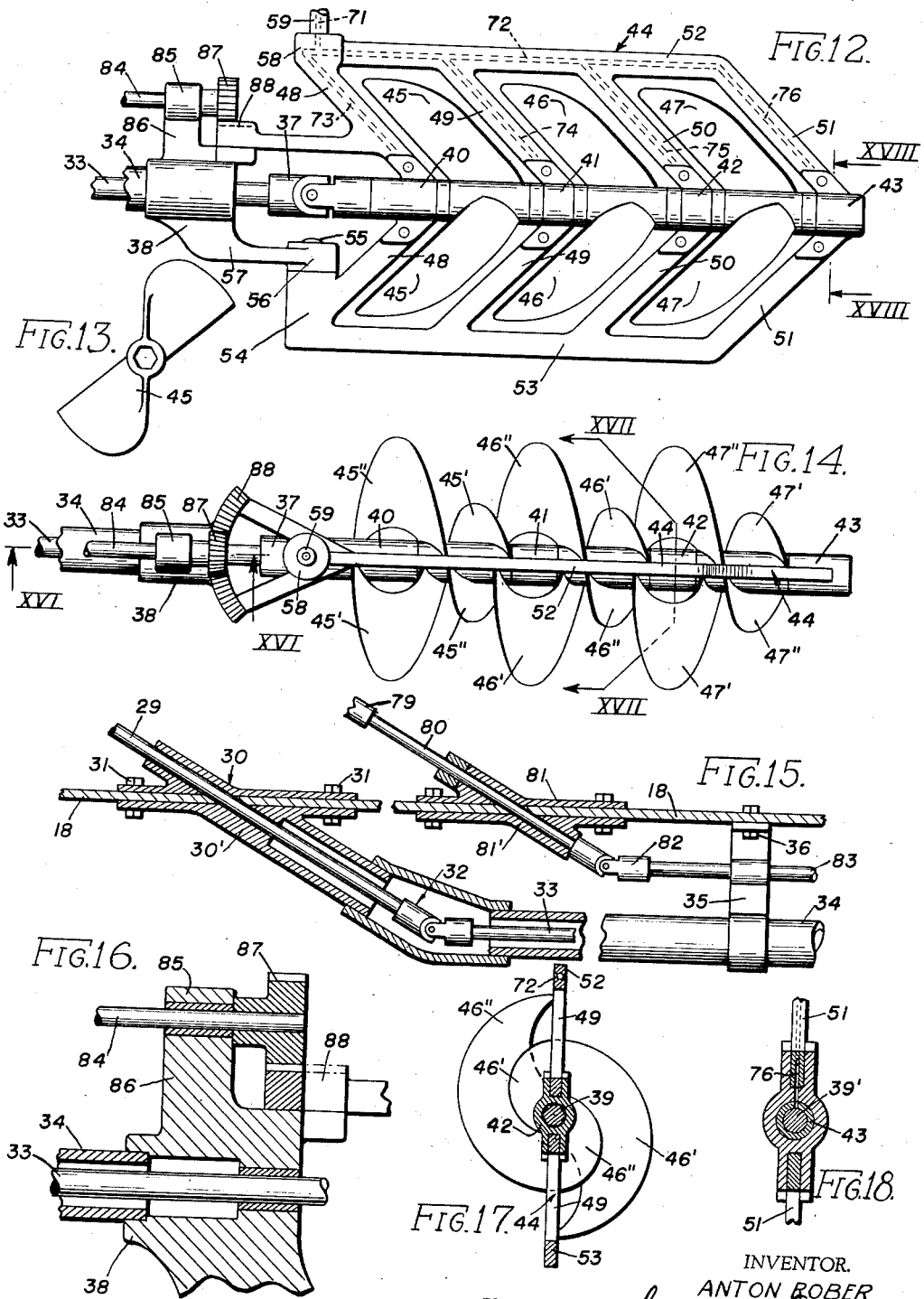

April 22, 1941.                A. ROBER                    2,239,016
                         WATER PROPELLING DEVICE
                         Filed Jan. 10, 1938           4 Sheets-Sheet 4
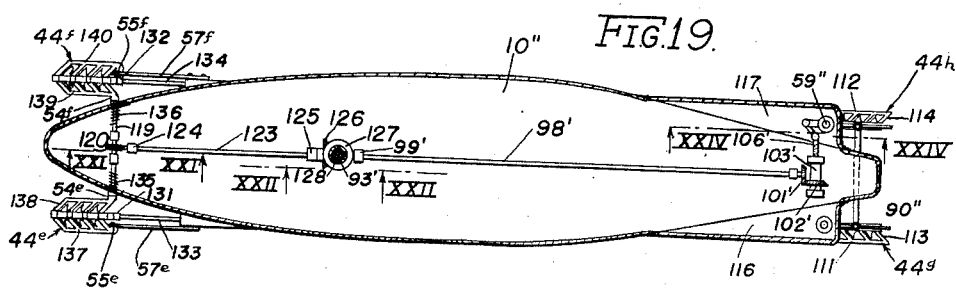
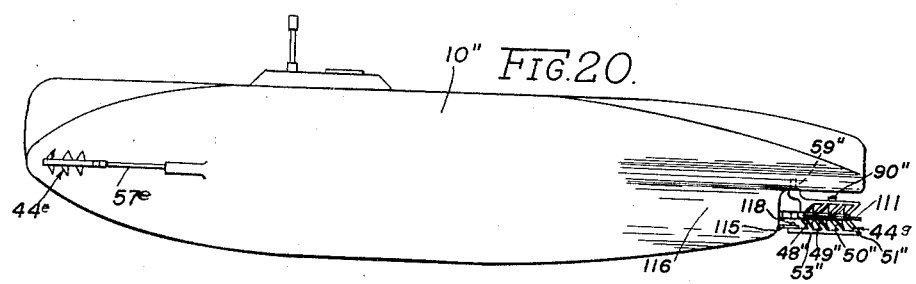
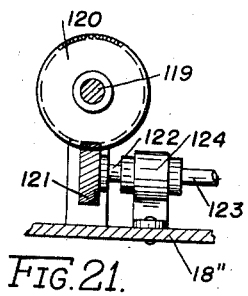
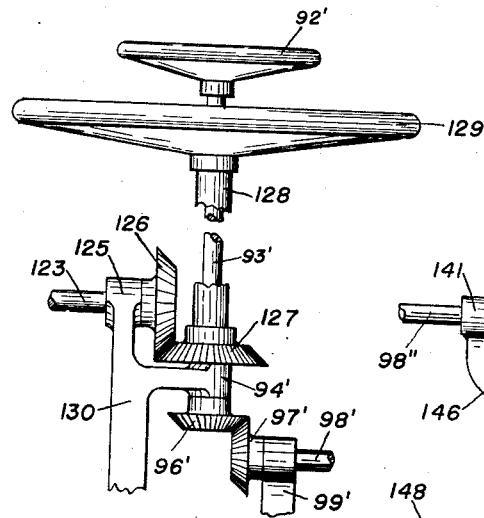
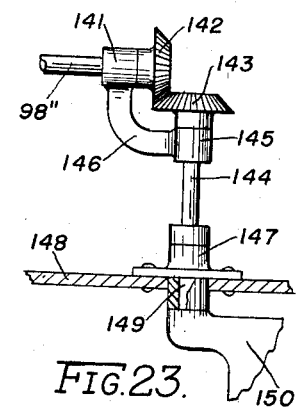
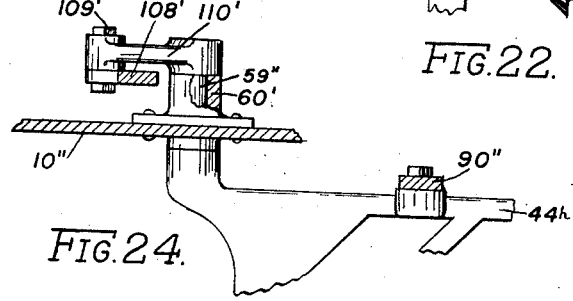
INVENTOR.
ANTON ROBER.
BY Harry C. Seventy,
ATTORNEY.

Patented Apr. 22, 1941

2,239,016

UNITED STATES PATENT OFFICE 2,239,016

WATER PROPELLING DEVICE

Anton Rober, Milwaukee, Wis.

Application January 10, 1938, Serial No. 184,171

8 Claims. (Cl. 115—24)

This invention relates to water propelling devices and more particularly to instrumentalities for imparting more effective maneuvering control thereto, although certain features thereof may be employed with equal advantage for other purposes.

It contemplates more especially the provision of improved combination propelling and steering instrumentalities for sport, commercial and naval combat boats generally termed water vehicles.

One object of the present invention is to provide improved combination propelling and steering instrumentalities for water vehicles.

Another object is to provide improved propelling means for sport, commercial and naval combat water vehicles.

Still another object is to provide water vehicles with improved steering instrumentalities for sport, commercial, and naval combat purposes.

A further object is to provide novel propelling and steering instrumentalities for water vehicles to enable more effective maneuvering thereof.

A still further object is to provide improved dual propelling means for forward and rearward operating placement in water vehicles to more effectively serve a combined steering and propelling purpose.

Still a further object is to provide improved combined elevator, propelling and steering mechanism for submarines and other naval combat vehicles.

Other objects and advantages will appear from the following description of an illustrative embodiment of the present invention.

In the drawings:

Figure 6 is a fragmentary plan view of a commercial water vehicle showing the arrangement of propelling instrumentalities, parts thereof being broken away to enable complete showing and to clarify the details.

Figure 7 is a fragmentary side view in elevation of the commercial vehicle shown in Figure 6.

Figure 8 is a fragmentary plan view of the propelling means used in connection with the commercial vehicle shown in Figures 6 and 7.

Figure 9 is a sectional view taken substantially along line IX—IX of Figure 6.

Figure 10 is a sectional view in elevation taken substantially along line X—X of Figure 6.

Figure 11 is a fragmentary sectional view in elevation of the propeller mechanism taken substantially along line XI—XI of Figure 6.

Figure 12 is a fragmentary side view in elevation of the propeller unit shown in Figures 1 and 2.

Figure 13 is an end view in elevation of the propeller unit shown in assembled relation in Figure 12.

Figure 14 is a plan view of a modified forward propeller unit that may be substituted for that shown in Figure 12.

Figure 15 is a fragmentary sectional view taken substantially along line XV—XV of Figure 2.

Figure 16 is a sectional view taken substantially along line XVI—XVI of Figure 14.

Figure 17 is a sectional view taken substantially along line XVII—XVII of Figure 14.

Figure 18 is a fragmentary sectional view taken substantially along line XVIII—XVIII of Figure 12.

Figure 19 is a sectional plan view of the submarine showing the descent, ascent and steering propelling instrumentalities embodying features of the present invention.

Figure 20 is a side view in elevation of the naval combat submarine shown in Figure 19.

Figure 21 is a sectional view taken substantially along line XXI—XXI of Figure 19.

Figure 22 is a fragmentary side view in elevation of the steering mechanism shown substantially from line XXII—XXII of Figure 19, parts thereof being broken away to enable an enlarged view of the detailed elements.

Figure 23 is a sectional view in elevation taken substantially along the rear longitudinal median line of the submarine to show modified steering control where a single centrally disposed rear steering propeller unit is substituted for a pair of spaced steering propelling means of the type shown in Figure 19.

Figure 24 is a fragmentary sectional view of steering instrumentalities taken substantially along line XXIV—XXIV of Figure 19.

Figure 1:
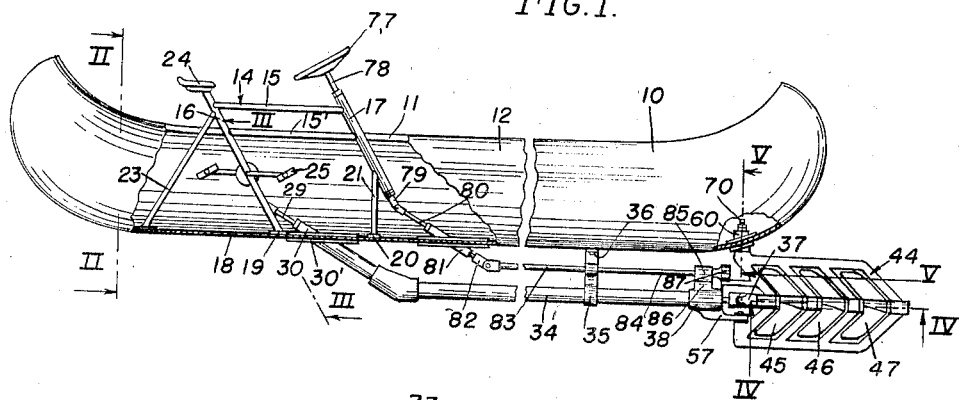
Figure 1 is a side view in elevation of a sport water vehicle having propelling and steering mechanisms embodying features of the present invention, parts thereof being broken away to clarify the illustration.

One of the structures selected for illustration comprises any suitable type of water vehicle such as a canoe 10 of conventional construction and preferably provided with specially constructed gunwales 11 and 12. The gunwales 11 and 12 are, in this instance, of tubular construction to present an elongated air chamber 13 therein that imparts more floating stability to the canoe or other water vehicle 10. This construction precludes or minimizes the possibility of capsizing even when the center of gravity is shifted to one side of the vehicle body 10, a common occurrence in the use thereof for sport purposes.

The vehicle 10 is preferably propelled by a rider who is seated on a frame 14 simulating a bicycle in its elements, there being a pair of horizontal bars 15 and 15' connected to downwardly forward inclined bars 16 and 17, the bar 14 being furcated to receive pedal instrumentalities as will appear more fully hereinafter. The inclined bars 16—17 are attached to the bottom 18 of the water vehicle 10 by any suitable means such as flanged attaching plates 19 and 20. It is to be noted that the flanged plate 20 is provided with a vertically extending bar 21 which merges into the inclined forward bar 17 to serve as a support therefor. Suitable converging side struts 22 and 23 connect with the frame 14 and are anchored in the bottom 18 of the vehicle 10 to maintain the frame 14 erect for sustaining the rider on a seat 24 constituting the upper extremity of the rearward inclined frame bar 17. The usual bicycle pedal mechanisms 25 fitted to the furcated frame bar 16, enables the rotation of its shaft 26 that carries a bevel gear 27 to mesh with a corresponding bevel gear 28 fixed to a forwardly inclined shaft 29 (Figures 1 and 15).

The forwardly inclined shaft 29 is journalled in a suitable bearing bracket consisting of confronting members 30 and 30' bolted or clamped together with the boat bottom 18 therebetween (Figure 15), this being effected by means of suitable fastening expedients such as the bolts 31. The shaft 29 extends through the bearing bracket 30—30' fixed to the vehicle bottom 18 and terminates in a universal joint 32 which enables the connection thereof to a horizontal shaft 33 to effect rotation in unison therewith. The horizontal shaft 33 is confined in a tubular casing 34 which is suspended by a bracket clamp 35 attached to the bottom 18 of the vehicle 10 by resort to any suitable fastening expedient 36. As shown, the horizontal shaft 33 has a universal joint 37 (Figure 12) attached to its extremity that projects beyond a bearing 38 which is fixed to the extremity of the shaft housing 34. The universal joint 37 is, in turn, attached to a polygonal propeller shaft 39 (Figure 4) journalled in a plurality of bearings 40, 41, 42 and 43, in this instance four, that comprises a part of a propeller guard 44 (Figures 1 and 12).

Suitably constructed propellers 45, 46, and 47, in this instance three, have polygonal bores (Figure 13) to serve as a complement of the shaft 39 intermediate the bearings 40, 41, 42 and 43 for rotation therewith. The inclination and shape of the propeller blades 45, 46, and 47 determines the inclination of upper and lower intermediate guard ribs 48, 49, 50 and 51 that diverge rearwardly in a vertical plane from the bearings 40, 41, 42 and 43, respectively. The corresponding upper and lower ribs, 48, 49, 50 and 51 of the propeller guard 44 are integrally joined at their extremities to horizontal bars 52 and 53 that define a propeller guard of integral construction and serves as a mount therefor beyond the confines of the vehicle 10 and in a water submerged position with respect to the vehicle's normal floating level. As shown, the lower horizontal propeller guard 53 terminates in an upwardly extending boss 54 which has a projecting pin 55 that extends through and pivotally effects the connection thereof to the terminus bearing 56 formed integral with an arm 57 constituting a part of the shaft housing bearing 38 (Figure 12).

Figures 4, 5:
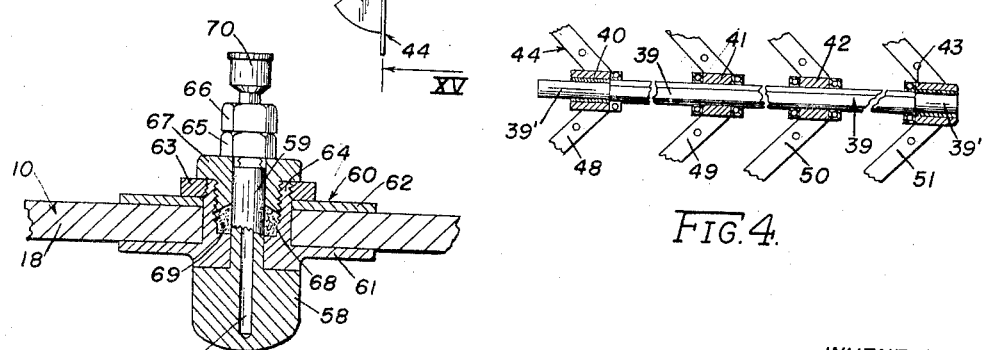
Figure 4 is a fragmentary sectional view taken substantially along line IV—IV of Figure 1.
Figure 5 is a sectional view taken substantially along line V—V of Figure 1.

Now, then, the upper horizontal guard 52 terminates in a boss 58 having an upwardly extending stub shaft 59. The stub shaft 59 is journalled in a bearing bracket 60 (Figure 5) consisting of spaced confronting flanged members 61 and 62 for attachment with the forward bottom portion 18 in the instance of the canoe 10 by means of a threaded nut 63 that engages a correspondingly threaded extremity 64 of the bearing 60. The stub shaft 59 extending from the boss 58 of the propeller guard 44, is vertically journalled in the bearing bracket 60 to extend upwardly into the interior of the vehicle 10 for connected mounting by means of a threaded nut 65 preferably having a correspondingly threaded lock nut 66 positioned axially thereover. In order to preclude leakage of water to the interior of the vehicle 10 through the pivotal guard bearing mount 60, a packing nut 67 threadedly engages the internal bore 68 provided axially in the bearing bracket 60 so as to receive and tightly compress a suitable packing material 69 around the stub shaft 59 (Figure 5).

A suitable oil or grease cup 70 threadedly engages the upwardly extending extremity of the stub shaft 59 so as to provide for the lubrication of the propeller shaft 39. To this end, the grease cup 70 communicates with an internal lubricating passage 71 provided axially through the stub shaft 59 and extending into the body or boss 58 (Figure 5). A suitable lubrication conduit or passage 72 communicates with the oil passage 71 (Figure 12) to extend along the upper horizontal guard bar 52, the passage 72 being cast, machined or otherwise formed therein in any manner as commercial practice may dictate. The lubricating conduit or passage 72 extends, in this instance, along the entire length of the upper guard bar 52 to communicate with branched conduits 73, 74, 75 and 76 which are cast, machined or otherwise formed in the upper inclined guard ribs 48, 49, 50 and 51, respectively, to receive a lubricant from the horizontally disposed oil conduit 72. The branched conduits 73, 74, 75, and 76 communicate, in turn, with the bearings 40, 41, 42 and 43, respectively, that support the propeller shaft 39 that is polygonal in shape between the otherwise round bearing supported portions 39' (Figure 4). The particular shape of the propellers 45 may be varied to meet the different functional requirements thereof.

Figure 2:
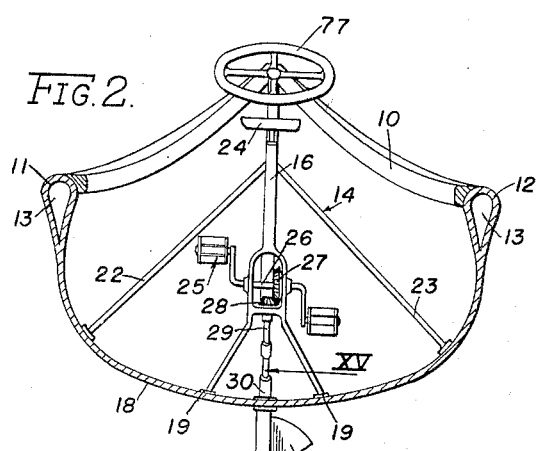
Figure 2 is a sectional view taken substantially along line II—II of Figure 1.
Figure 3:
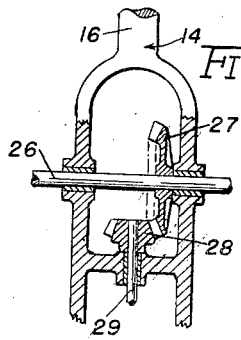
Figure 3 is a fragmentary sectional view taken substantially along line III—III of Figure 1.

It will be apparent that the shaft 33 is rotated responsive to any source of power such as the pedal means 25 to the sport boat 10 (Figure 2) or an engine or motor power plant that would be used in commercial and naval boats to impart rotation to the propeller shaft 39. The propeller unit 44 not only serves the usual purposes of locomotion, but also effects the steering of the vessel or water vehicle. As shown, the guard 44 with its auxiliary parts, pivots about the stub shaft 59 and such is controlled through remote steering instrumentalities which, in the sport boat 10 (Figures 1 and 15), comprises a wheel 77 fixed to a shaft 78 journalled in the forward inclined frame bar 17 to project therethrough and connects with another shaft 80 (Figures 1 and 15) that is, in turn, journalled in a bearing bracket comprising confronting members 81—81' bolted together with the bottom 18 of the boat 10 therebetween in precisely the same manner as the bearing bracket member 30—30' described supra.

The extremity of the shaft 80 projects through the bearing bracket members 81—81' for connection with a universal joint 82 that is fixed to a horizontal shaft 83 journalled in the bearing bracket 35 supporting the shaft housing 34 described supra. The shaft 83 is, in this instance, in horizontally spaced parallelism and above the shaft housing 34 so that the shaft extremity 84 will be supported in the bearing 85 (Figures 1 and 12) constituting a part of the bearing 38 and formed integrally therewith through an arm 86. A pinion 87 is fixed to the extremity of the steering shaft 84 beyond the bearing 85 (Figure 12) for meshing engagement with a horizontally disposed gear sector 88 formed integral with the upper inclined guard rib 48. In consequence thereof, rotation of the steering wheel 77 will impart corresponding pivotal movement to the propeller guard 44 about its stub shaft 59 to vary the direction thereof for steering purposes while the propellers 45—46—47 are being rotated to impart movement to or effect the locomotion of the water vehicle or craft 10.

Obviously, the propelling and steering instrumentalities are submerged below the surface of the water and the vehicle 10 should be designed as to weight and propelling mechanism distribution so as to counteract the load of the individual supported on the seat 24. With the arrangement of parts above described, it will be apparent that a novel propelling and steering attachment has been provided for water sport vehicles in the form of the canoe 10 or any other type of vessel that may be desired. In the modified propeller embodiments shown in Figures 14 and 17, the shape of each propeller consists, in this instance, of double helical curved blades 45′—45″, 46′—46″, and 47′—47″. These double helical blades are, in each instance, fixed to a unitary hub corresponding with the hubs of the previously described propellers 45, 46 and 47 so that they can be interchanged depending upon the dictates of commercial practice and the requirements of any particular installation.

In the commercial vehicle 10′ shown in Figures 6 and 7, dual pairs of propeller units 44a—44b and 44c—44d are provided forwardly and rearwardly, respectively. The construction of these propeller units 44a—44b and 44c—44d, are similar to that shown in either Figures 1, 12 or 14 so that a further detailed description of the individual parts is not thought necessary to fully comprehend the character of the structure. The propelling units 44a—44b are pivotally mounted in their respective positions forwardly of the vessel 10′ by means of their stub shafts 59a and 59b, respectively, precisely in the manner described supra in the embodiment shown in Figures 1 and 12.

These dual propelling units 44a—44b are interconnected for corresponding pivotal steering displacement by means of lever arms 89 extending from each guard unit 44a and 44b (Figures 8 and 11) for interconnection by a link bar 90 in much the same manner as the forward wheels of an automobile. In the present embodiment, the forward propelling units 44a—44b are pivotally mounted for steering as well as propelling while the rearward propelling units 44c—44d are rigidly mounted so as to serve merely as propelling means without assisting in the steering operation except, perhaps, in controlling and modifying the relative speed of rotation of the propeller units 44c and 44d.

To this end, the rearward propelling units 44c—44d are each provided with a pair of spaced mounting bearings 58′—58c and 58″—58d similar to the bearing 58 described in the embodiment shown in Figure 12, to effect their rigid suspension against pivotal movement. The propeller rotating shafts 33′ for the propeller units 43c—44d extend forwardly to the power source such as the boat engines (not shown) to impart rotation thereto. Similar shafts 33″ extend from the same or separate engines (not shown) to the forward propeller units 44a—44b for operative connection therewith through universal joints that permit pivotal displacement for steering in the manner described in connection with the embodiment shown in Figures 1, 12 and 15.

The steering instrumentalities for the forward propelling units 44a—44b consists, in this instance, of a steering wheel 92 (Figure 10) fixed to a vertical shaft 93 (Figures 6 and 10) journalled in a bearing 94 that is rigidly supported by a bracket 95 fixed to the frame structure of the boat 10′. A bevel gear 96 is fixed to the lower extremity of the vertical steering shaft 93 which extends below the bearing 94, a bevel gear 96 meshing with another bevel gear 97 fixed to a horizontal shaft 98 journalled in a bearing bracket 99 fixed to the frame structure of the boat 10′ (Figure 10). The shaft 98 is journalled at its other extremity in a bearing 100 (Figure 6) and has a bevel gear 101 mounted on its extremity for meshing engagement with a bevel gear 102 carried by a transverse tubular shaft 103 (Figures 6 and 9). The transverse tubular shaft 103 is journalled for support in bearings 104 and 105.

Consequently, the tubuluar shaft 103 rotates responsive to the rotation of the wheel 92 to extend or retract a threaded rod 106 threaded to the interior of the tubular shaft 103 (Figures 6 and 9). In so doing, the threaded rod 106 is extended or retracted responsive to the rotation of the tubular shaft 103 that is operatively connected to the steering wheel 92. As shown, the threaded rod 106 has a furcated extremity 107 (Figure 11) to afford the pivotal connection thereof to a link 108 (Figures 6 and 11) that is, in turn, pivotally connected as at 109 to a crank arm 110. The crank arm 110 is fixed to the stub shaft 59a comprising an integral part of the propeller units 44a which is pivotally mounted through the bottom of the boat 10′ in a manner described in connection with the embodiment shown in Figures 1 and 12, there being a bearing bracket 60a to rotatively support the stub 59a relative to the forward frame structure of the boat 10 (Figure 11).

As a result, the propeller unit 44a will be pivotally displaced about its stub shaft 59a and the other forward propeller unit 44b will be correspondingly displaced owing to the interconnection afforded by the link rod 90 described supra. In consequence thereof, the forward propellers 44a—44b will provide for steering as well as forward propelling responsive to the remote control wheel 92 conveniently disposed within the captain's quarters of the boat 10′. The particular shape of the propeller blades embodied in the propeller units 44a—44b and 44c—44d may vary depending upon the dictates of commercial practice and such may follow the design of propellers 45, 46, and 47 or 45′—45″, 46′—46″, and 47′—47″ of the embodiments shown in Figures 12 and 14.

In naval combat water craft such as a submarine 10″, the dual forward and rearward propeller units 44e—44f and 44g—44h, respectively, are similar to the corresponding elements shown in the commercial craft 10′ in the preceding embodiment. In naval combat water craft 10″, however, it is proposed to effect submerging, emerging and steering maneuvers by resort to the forward and rearward propelling units 44e—44f and 44g—44h, respectively, in addition to the means now employed for controlling the ascent and descent thereof. To this end, the rear supporting propeller units 44g—44h may be precisely of the same construction as the corresponding forward elements 44a—44b in the previously described commercial boat 10'.

In the embodiment shown in Figure 19, however, the rear steering propeller units 44g—44h are provided with laterally extending guard bars 111 and 112, respectively, that are joined to the bearings thereof by inclined ribs 113 and 114 disposed between the propellers in much the same manner as the vertically disposed inclined ribs 48", 49", 50" and 51". In this instance, it should also be noted that the propeller units 44g—44h have the ribs 48", 49", 50", and 51" inclined in a direction opposite to the corresponding ribs 48, 49, 50 and 51 shown in the first described embodiment in Figure 12. This reversal and inclination are due to the fact that the combination propelling and steering units 48g—44h are disposed rearwardly of the water vehicle 10" while in the embodiments shown in Figures 1, 6 and 12, the steering propeller units are disposed forwardly. This accounts for the reversal in shape of the corresponding members comprising the propeller units in the respective adaptations.

Then, too, the combination propeller and steering units 44h—44g have an additional pivot support bar or bracket 115 (Figure 20) attached to and rigidly extending from the lateral portions 116 and 117 of the submarine 10" (Figure 19). The brackets 115 provide a point of pivotal joinder as at 118 to the lower guard rail 53" of the propeller units 44g—44h (Figure 20). It will be noted that the lowermost pivotal mount 118 is in axial alignment with the upper pivotal mount 59" (Figure 24) so as to provide double heavy duty pivotal connections for each of the combination rear propeller and steering units 44g—44h. This rigidifies the structure and insures against deflection on account of the large stresses that each of the propeller units 44g—44h are subjected to during the operation thereof.

The forward propeller units 44e—44f are pivotally mounted for movement in a vertical plane to control and assist in the descent and ascent of the submarine 10". To this end, the propeller units 44e—44f are disposed with their pivotal mounting bosses 54e—54f extending horizontally rather than vertically so as to connect with a horizontally disposed shaft 119 that is journalled transversely through the forward end of the submarine 10" in suitable bearings (Figure 19). The shaft 119 has a wormwheel 120 fixed thereto for meshing engagement with a worm 121 fixed to the extremity 122 of a control shaft 123 (Figure 21).

The control shaft 123 extends, in this instance, in longitudinal alignment with the rearward steering control shaft 98', it being journalled for spaced support in bearings 124 and 125 (Figure 19). A bevel gear 126 is fixed to the other extremity of the shaft 123 for meshing engagement with another bevel gear 127 fixed to a tubular shaft 128 that surrounds and is rotatable relative to the vertical steering shaft 93' (Figure 22). The elevator control wheel 129 is fixed to the upper extremity of the tubular shaft 128, it being larger than the steering wheel 92' in that substantially more power will be required in varying the vertical pivotal position of the combination propeller and elevator control units 44e—44g than for steering the rear propeller units 44g—44h.

It is to be noted that the horizontal bearing 125 and the vertical bearing 94' (Figure 22) are integrally joined by a vertical support bracket 130 that is fixed to the interior body of the submarine 10". With this arrangement, rotation of the elevator control wheel 129 will pivot the propeller units 44e—44f upwardly and downwardly, their shafts being connected to the power source through universal joints 131 and 132, respectively, (Figure 19) to permit this relative motion during shaft rotation for propelling purposes. The universal joints 131—132 are, in turn, connected to shafts 133 and 134 that extend rearwardly into the hull of submarine 10" for operative connection to the source of power such as a Diesel engine or electric motors (not shown) to impart rotation thereto.

It is to be noted that the elevator control shaft 119 has a worm wheel 120 fixed thereto intermediate the extremities thereof, and is provided with oppositely wound enveloping springs 135 and 136 which have one end of each anchored to the shaft 119 while the other end engages the hull of the submarine 10". The springs 135 and 136 serve to urge the elevator propeller units 44e—44f to their normally horizontal or neutral position upon releasing the grasp on the control wheel 129. Then, too, the combination elevator and propeller units 44e—44f have side guard rails 137—138 and 139—140 to afford lateral protection thereto, these being provided with inclined ribs of the type described supra to effect the joinder thereof to the intermediate propeller shaft bearings. To afford a double horizontal pivot for the elevator propeller units 44e and 44f each is provided with a brace bar 57e and 57f, respectively, that rigidly extends from the submarine hull 10" for pivotal connection as at 55e and 55f to the propeller units 44e and 44f, respectively. This places the double pivots 54e—55e and 54f—55f of each forward propeller units 44e and 44f, in axial registry. It will be apparent, therefore, that both steering and elevator control is effected responsive to the concentrically disposed and adjacently positioned wheels 92' and 129 to render more effective the maneuvering capacity of the submarine 10".

In the event a single steering propelling unit is utilized along a longitudinal rear median position of the submarine 10" in lieu of a pair of spaced propeller units 111—112 as shown in Figure 19, the rear steering instrumentalities of the type shown in Figure 19 is substituted by modified connecting instrumentalities shown in Figure 23. In this instance, the rearwardly extending steering shaft 98" is journalled for support in the rear bearing 141 to carry a bevel gear 142 meshing with a bevel gear 143. The bevel gear 143 is fixed to a single shaft 144 journalled in a vertical bearing 145. The horizontal bearing 141 and the vertical bearing 145 are connected by an integral arm 146 to maintain the bevel gears 14 and 143 in fixed meshing relation.

The vertical shaft 144 extends downwardly for journalled support in a bearing bracket 147 fixed to the bottom 148 of a water vehicle fitted with a single rear steering and propelling unit. As shown, the lower extremity of the shaft 144 constitutes a part of a pivotal supporting stud 149 comprising a part of the single propeller unit frame 150 that is similar in construction to the previously described propeller units (Figure 12) and is used in lieu of a pair of spaced propeller units of the type shown in Figure 19. The other instrumentalities are similar in construction and arrangement so that a further description thereof would not be necessary to understand the operation thereof.

With the arrangement of parts above described, it will be apparent that improved combination propelling, steering, and elevator-propelling units have been provided for sport, commercial, and naval combat vessels. Various changes may be made in the embodiment of the invention herein specifically described without departing from or sacrificing any advantages of the invention, or any features thereof, and nothing herein shall be construed as limitations upon the invention, its concept or structural embodiment as to the whole or any part thereof except as defined in the appended claims.

I claim:

1. In a water vehicle, the combination with a floating body, of a plurality of propellers extending from said body into the water, means in said body for operating said propellers, means for varying the position of certain of said propellers independent of the other propellers for steering control purposes, means for varying the position of certain other propellers independent of the steering propellers for elevator control purposes, and concentrically arranged means within said floating body for operating said steering and elevator propeller control means.

2. In a water vehicle, the combination with a floating body, of a plurality of propellers extending from said body into the water, each of said propellers including a plurality of axially spaced helically disposed blades mounted on a common shaft, means in said body for operating said propellers, means for varying the position of certain of said propellers independent of the other propellers for steering control purposes, means for varying the position of certain other propellers independent of said steering propellers for elevator control purposes, and concentrically arranged means within said floating body for operating said steering and elevator propeller control means.

3. In a water vehicle, the combination with a floating body, of a plurality of propellers extending from said body into the water, each of said propellers including a plurality of axially spaced helically disposed blades mounted on a common shaft, means in said body for operating said propellers, universal joints interposed between said propellers and their operating means, means for varying the position of certain of said propellers independent of the other propellers for steering control purposes, means for varying the position of certain other propellers independent of said steering propellers for elevator control purposes, and concentrically arranged means within said floating body for operating said steering and elevator propeller control means.

4. In a water vehicle steering propeller unit, the combination with an enclosed frame, of a stub shaft formed on said frame to serve as a pivotal mount for said frame, a shaft journalled in said frame, said shaft projecting beyond said frame for connection to a source of power rotation, intermediate ribs extending from said frame to provide supports for bearings in axial alignment with said shaft, and propeller blades fixed to said shaft between said intermediate ribs and said frame for unitary rotation, said propeller blades being shaped to substantially simulate a compound progressing helix.

5. In a water vehicle steering propeller unit, the combination with an enclosed frame, of a stub shaft formed on said frame to serve as a pivotal mount for said frame, a shaft journalled in said frame, said shaft projecting beyond said frame or connection to a source of power rotation, intermediate ribs extending from said frame to provide supports for bearings in axial alignment with said shaft, propeller blades fixed to said shaft between said intermediate ribs and said frame for unitary rotation, said propeller blades being shaped to substantially simulate a compound progressing helix, and a second stub shaft formed integral with said frame for journalled connection to a water vehicle body to pivotally support the propeller unit.

6. In a water vehicle steering propeller unit, the combination with an enclosed frame, of a stub shaft formed on said frame to serve as a pivotal mount for said frame, a shaft journalled in said frame, said shaft projecting beyond said frame or connection to a source of power rotation, intermediate ribs extending from said frame to provide supports for bearings in axial alignment with said shaft, propeller blades fixed to said shaft between said intermediate ribs and said frame for unitary rotation, said propeller blades being shaped to substantially simulate a compound progressing helix, a second stub shaft formed integral with said frame for journalled connection to a water vehicle body to pivotally support the propeller unit, and means operatively connected to said frame to enable the pivotal adjustment thereof relative to said stub shaft from a remote position.

7. In a water vehicle steering propeller unit, the combination with an enclosed frame, of a stub shaft formed on said frame to serve as a pivotal mount for said frame, a shaft journalled in said frame, said shaft projecting beyond said frame for connection to a source of power rotation, intermediate ribs extending from said frame to provide supports for bearings in axial alignment with said shaft, propeller blades fixed to said shaft between said intermediate ribs and said frame for unitary rotation, said propeller blades being shaped to substantially simulate a compound progressing helix, a second stub shaft formed integral with said frame for journalled connection to a water vehicle body to pivotally support the propeller unit, and means associated with said frame to lubricate said shaft supporting bearings from a stub shaft vehicle body connecting position.

8. In a water vehicle steering propeller unit, the combination with an enclosed frame, of a stub shaft formed on said frame to serve as a pivotal mount for said frame, a shaft journalled in said frame, said shaft projecting beyond said frame for connection to a source of power rotation, intermediate ribs extending from said frame to provide supports for bearings in axial alignment with said shaft, propeller blades fixed to said shaft between said intermediate ribs and said frame for unitary rotation, said propeller blades being shaped to substantially simulate a second compound progressing helix, and a stub shaft formed integral with said frame for journalled connection to a water vehicle body to pivotally support the propeller unit, lubricating means attached to said stub shaft, and conduits associated with said frame and connecting ribs to conduct a lubricant to said bearings.

ANTON ROBER.